United States Patent [19]

Harpster

[11] 4,070,625
[45] Jan. 24, 1978

[54] APPARATUS FOR MEASURING THE DISTANCE TO THE FLOOR OF THE CARGO HOLD OF A SHIP THROUGH INTERVENING BULK MATERIAL

[75] Inventor: Joseph W. Harpster, Galena, Ohio

[73] Assignee: Dravo Corporation, Pittsburgh, Pa.

[21] Appl. No.: 723,066

[22] Filed: Sept. 14, 1976

[51] Int. Cl.² .................................... G01R 33/12
[52] U.S. Cl. ............................... 324/239; 324/67;
   214/15 D; 214/762
[58] Field of Search ............... 324/34 D, 34 P, 34 R,
   324/34 TK, 3, 67, 41; 340/258 C, 282; 214/15
   E, 15 D, 17 D, 17 B, 762

[56] References Cited

U.S. PATENT DOCUMENTS

| 674,753 | 5/1901 | Bennik | 214/15 E |
| 2,160,356 | 5/1939 | Fore et al. | 324/41 |
| 3,858,737 | 1/1975 | Senoo | 214/762 |
| 3,907,136 | 9/1975 | Christides | 214/762 |

FOREIGN PATENT DOCUMENTS

| 1,087,216 | 10/1967 | United Kingdom | 324/3 |
| 1,299,183 | 12/1972 | United Kingdom | 324/3 |

*Primary Examiner*—Robert J. Corcoran
*Attorney, Agent, or Firm*—Parmelee, Miller, Welsh & Kratz

[57] ABSTRACT

Apparatus for measuring the distance to and through magnetically permeable materials having a planar surface includes a dipole field generating magnetic field transmitting antenna and a dipole field sensitive receiver antenna. The antennae are displaced from one another in a direction parallel to the planar surface a distance $d$ with the field axis of one antenna, preferably the transmitting antenna, parallel to the planar surface and with the axis of the field of the other antenna intersecting and perpendicular to the axis of the field of the first antenna and substantially perpendicular to the planar surface. With this arrangement, perturbations in the magnetic field caused by the magnetically permeable material induce a signal in the receiver antenna which is proportional to $1/D^3$ where D is the distance between the antenna and the planar surface and is of the same order as $d$. The effects of intervening or adjacent fixed or rotating magnetically permeable materials are nulled out geometrically and/or electrically.

13 Claims, 7 Drawing Figures

APPARATUS FOR MEASURING THE DISTANCE TO THE FLOOR OF THE CARGO HOLD OF A SHIP THROUGH INTERVENING BULK MATERIAL

BACKGROUND OF THE INVENTION

1. Field of the Invention

This invention relates to electromagnetic field activated distance measuring equipment and more particularly to apparatus utilizing a magnetic field to measure the distance to a magnetically permeable object despite the presence of adjacent or intervening magnetically permeable materials, and to measure the depth of a layer of magnetically permeable bulk material.

2. Prior Art

Prior art electromagnetic distance measuring devices have for the most part been of the capacitance or eddy current type. The capacitance type determines the distance to an electrically conductive object by measuring the electrical capacitance between a charged plate and the object. The eddy current type of detector operates on the principle that the magnetic field generated by an alternating electric current, induces eddy currents in electrically conductive objects which in turn generate their own magnetic fields tending to oppose the primary field. By detecting and measuring the effect of these eddy currents, the distance to the object may be determined. An example of such a proximity gauge is disclosed in U.S. Pat. No. 3,609,527 wherein a differential probe is connected in a bridge circuit to detect the effects of the induced eddy currents. Eddy current detectors operate at high frequencies, generally above 50 kilohertz.

Magnetic field sensors have been utilized in detecting the presence of, as opposed to measuring the distance to, magnetically permeable objects. One such system disclosed in U.S. Pat. No. 3,644,825 indicates, in addition to the presence of a metallic object, the direction of movement of the object or if the direction of movement is known, the relative position of the object. It does not, however, indicate the distance to the metallic object.

Devices have also been designed for detecting the presence of metallic objects in metallic or nonmetallic ores. Examples of such devices are illustrated in U.S. Pat. Nos. 2,819,447, 3,588,685 and 3,588,686. All of the devices utilize the eddy current principle to detect electrically conductive tramp metal in ores transported by a conveyor. The first utilizes a high frequency oscillator in which an inductor which comprises one of the components of the oscillator circuit surrounds the ore carrying conveyor belt. The passage of tramp metal through the window in the inductor alters its effective inpedance and thereby changes the oscillator frequency. U.S. Pat. No. 3,588,686 operates in a similar manner but at a frequency of 5 to 20 kHz and provides a clamping circuit to prevent tripping of the alarm signal as the metal lacings in the belt pass through the inductor coil. In U.S. Pat. No. 3,588,685 the phase shift caused by eddy currents induced in the tramp metal is detected by an antenna system in which the perpendicular projection of the antennae on the plane of the conveyor is trapezoidal such that the foreign body is detected irrespective of its shape, orientation or position on the conveyor. All of the devices detect only the presence and not the distance to the detected object.

It is an object of the present invention to provide an economical, reliable, noncontact means of determining distance to an object whether or not there is intervening material. More particularly, the invention is directed to determining the distance to a large metal object such as a steel plate and especially in the presence of intervening bulk material which may or may not be magnetically permeable. The invention is also useful in determining the depth of magnetically permeable bulk material resting on a planar, nonmagnetic surface. It is an object of the invention to utilize a magnetic field and the magnetic properties of the object and any intervening material to effect the measurement.

SUMMARY OF THE INVENTION

According to the invention, apparatus for measuring the distance to and through magnetically permeable material having a planar surface includes a dipole field generating magnetic field radiator and a dipole field receiver antenna. The field radiator and receiver antenna are displaced from one another in a direction parallel to the planar surface by a distance $d$ at least equal to the dimensions of the radiator with the axis of the field of one parallel to the planar surface and displaced therefrom by a distance $D$ which is the same order as $d$, and with the axis of the field of the other intersecting and perpendicular to the axis of the field of the first and substantially perpendicular to the planar surface. A receiver circuit connected to the receiver antenna generates, as a function of the field perturbations detected by the receiver in the presence of the magnetically permeable material, a signal representative of the distance $D$.

Where the distance $D$ is less than $2d$ but greater than the antennae dimensions, the signal generated by the receiver circuit follows the $1/D^3$ law such that a log converter in the receiver circuit produces an output signal linearly proportional to $D$.

The field radiator may be a permanent magnet but perferably it is a transmitter antenna connected to an oscillator operating below 50 kHz. It is preferred that the axis of the generated magnetic field be parallel to the planar surface with the field of the receiver antenna perpendicular thereto.

Where the magnetically permeable material is a magnetically permeable plate, the device generates an indication of the distance $D$ to the plate. Mechanical and/or electrical nulling means can generally be utilized to null out the effects of intervening magnetically permeable bulk material or of magnetically permeable support means that remain fixed with respect to antennae positions. In the particular embodiment of the invention diclosed, the antennae are connected to a bucket ladder which unloads bulk materials such as magnetically or nonmagnetically permeable ores and other cargoes from the hold of a cargo ship. In this application, the device measures the distance through the bulk cargo to the steel floor of the cargo hold in order to provide an indication of the approach of the buckets to the bottom of the hold. In some configurations of antenna placement a sample and hold circuit in the receiver circuit, which samples and stores a signal representative of the distance $D$ at intervals determined by triggering means, is necessary to eliminate periodic signal levels induced by the rotating equipment. The triggering means is synchronized with movement of the buckets on the bucket ladder so that the effect of the moving buckets on the magnetic field can be nulled out.

The device may also be used to measure the depth $D$ of magnetically permeable bulk material resting on a planar surface having a magnetic permeability which is effectively negligible compared to that of the magnetically permeable bulk material. This mode of operation is useful in automatic control of reclaimers used to recover magnetically permeable ores such as taconite or magnetite and sinters of iron oxide from piles on the ground.

DESCRIPTION OF THE PREFERRED EMBODIMENT

Figure 1:
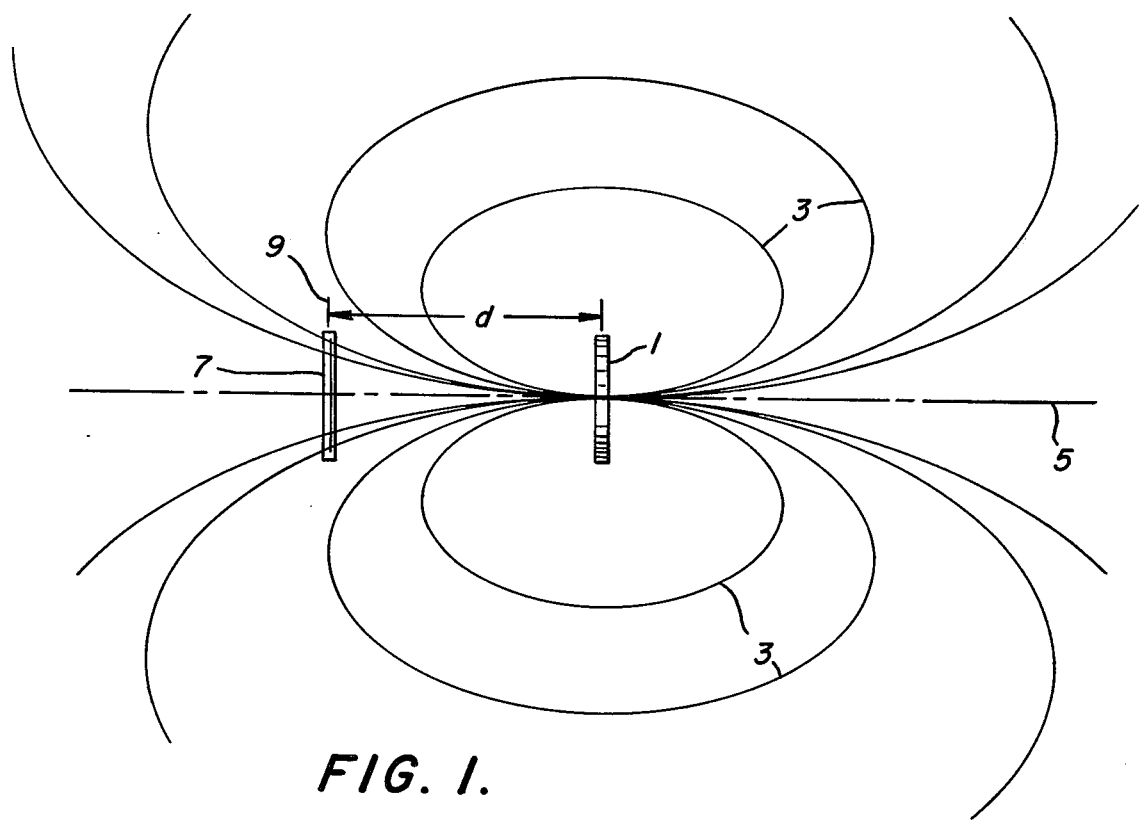
FIG. 1 is a schematic diagram illustrating the pattern of the magnetic field generated according to the invention and the relationship of the transmitter and receiver antenna thereto and to each other.

FIG. 1 illustrates schematically the spatial relationship of the field radiator and the magnetic field radiated thereby to the receiving antenna in accordance with the principles of the invention. The field radiator 1 generates a dipole magnetic field as represented by the lines of force 3 having a horizontal axis 5 as shown in the drawing. The field radiator may be a fixed or rotating permanent magnet, or it may be a transmitter antenna such as a stick antenna or a loop antenna (as shown) connected to a suitable electromagnetic signal generating circuit. In the case of the loop antenna shown, the plane thereof is perpendicular to the plane of the drawing and the field generated thereby is symmetrical for 360° about the axis 5 when the antenna is disposed in free space with no field perturbing obstacles present. Under these conditions the axis of the loop antenna 1 is coextensive with the axis 5 of the generated field 3.

The receiver antenna 7 is displaced from the transmitter antenna 1 by a distance $d$ along the axis of the loop antenna, which for free space corresponds to the axis 5 of generated magnetic field 3, with the axis 9 of the receiver antenna perpendicular to the axis 5. The receiver antenna may be a stick type, as shown, a wire loop type, such as the transmitter antenna 1, or it can be of the Hall effect type, a magnetometer or other magnetic pickup type. With this spatial arrangement of the field radiator and receiver antenna and with no magnetically permeable materials present, the net flux through the receiver antenna 7 is zero and no output signal is generated.

Figure 2:
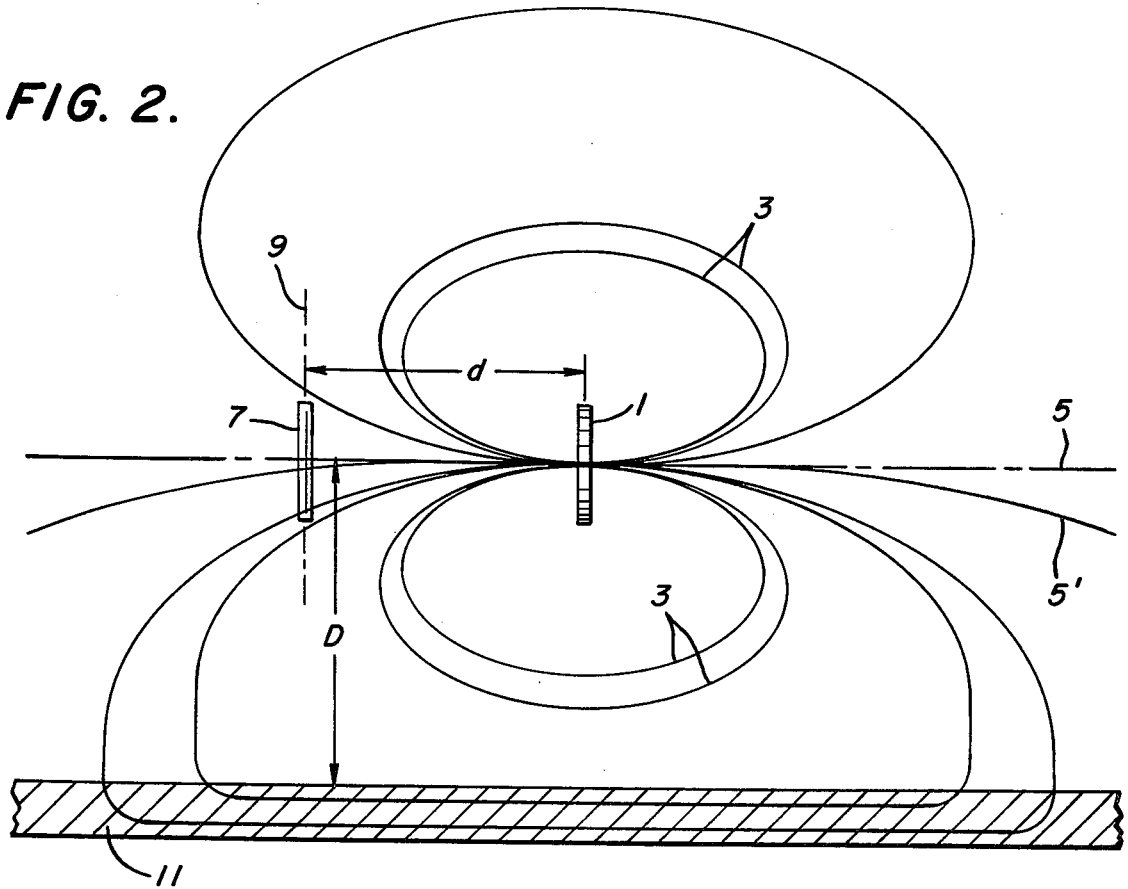
FIG. 2 is a schematic diagram illustrating the effect of the presence of a magnetically permeable plate on the field of FIG. 1 and the orientation of the antennae to the plate for measuring the distance thereto.

FIG. 2, however, illustrates the affect of a magnetically permeable material, in this case a large steel plate 11 disposed parallel to the axis 5, upon the arrangement shown in FIG. 1. The steel plate having a high permeability in effect short circuits part of the magnetic field and in doing so distorts the field as shown in FIG. 2. Under these conditions the magnetic flux line 5' of the magnetic field is bent toward the steel plate 11 such that the net flux through the receiver antenna 7 is no longer zero and a receiver output signal is generated. With the plate 11 located a distance D from the receiver antenna, the signal generated in the receiver antenna 7 is approximately proportional to $1/D^3$ over a significant range of distance so long as D remains less than approximately $2d$, such that by appropriate calibration of the output signal, the distance D to the metal plate may be magnetically measured.

In FIGS. 1 and 2 the radiator is oriented with the axis 5 thereof parallel to the planar surface of the steel plate and the axis 9 of the receiver antenna perpendicular thereto. It is also within the principles of the invention to interchange the positions of the transmitter and the receiver antennae. That is, the antenna 7 can be used to radiate a magnetic field having a vertical axis 9 with the antenna 1 serving as the receiving antenna. In this arrangement, the steel plate 11 would perturb the field such that the lines of force 3 representing the field would become oval or egg shaped, thereby generating a net flux across the antenna 1 which would be approximately proportional to $1/D^3$. For practical purposes, however, the arrangement of FIGS. 1 and 2 is more sensitive and is to be preferred.

Figure 3:
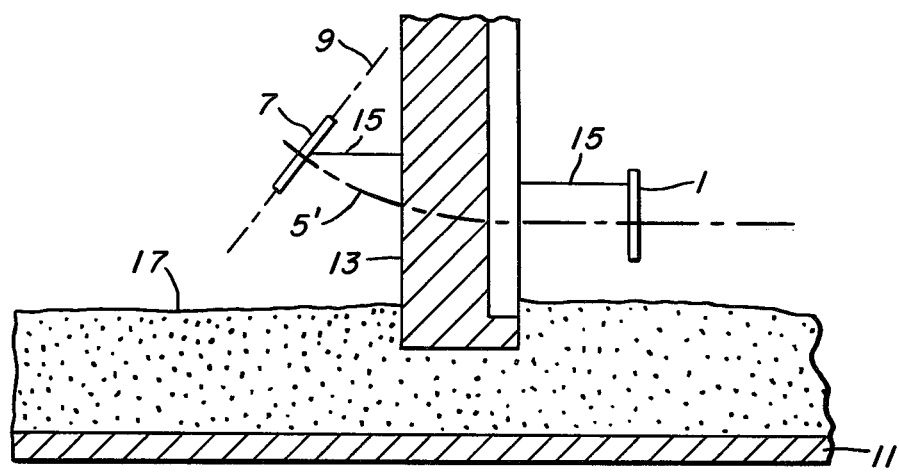
FIG. 3 is a schematic diagram illustrating the effect of a magnetically permeable support and of magnetically permeable bulk material on the orientation of the antennae.

Other magnetically permeable objects in addition to the steel plate can cause perturbations in the magnetic field. For instance, as shown in FIG. 3, a magnetically permeable support 13 to which the transmitter antenna 1 and receiver antenna 7 are attached by brackets 15 can cause distortion of the magnetic field. For example, a steel support 13 can distort the flux line 5' of the magnetic field upward as shown. This distortion caused by the magnetically permeable support can be nulled out mechanically such as by reorienting the receiver antenna 7 such that it remains centered on the flux line 5' of the magnetic field with the axis 9 of the antenna field pattern remaining perpendicular to the flux line 5'. With this arrangement, which is exaggerated in FIG. 3 for the purpose of illustration, the presence of the magnetically permeable support has negligible affect upon the measurement of the distance to the magnetically permeable plate 11.

Intervening magnetically permeable material, including iron ores such as taconite or magnetite and sinters of iron oxide, may also be present without destroying the ability of the apparatus to "see" the metal plate and measure its distance from the receiver antenna. For instance, as shown in FIG. 3, sinter 17 may cover the entire surface of the steel plate for a considerable depth, and may even cover the antennae. The effects of the magnetically permeable intervening material may be nulled out mechanically by adjusting the physical positioning of the antennae as discussed above in connection with the affects of the metal support structure or electronically in a manner to be discussed below. Such nulling is performed at the surface of the intervening material at a distance from the steel plate greater than the maximum detectable distance Dmax of the measuring system. Usually Dmax is greater than $2d$.

Figure 4:
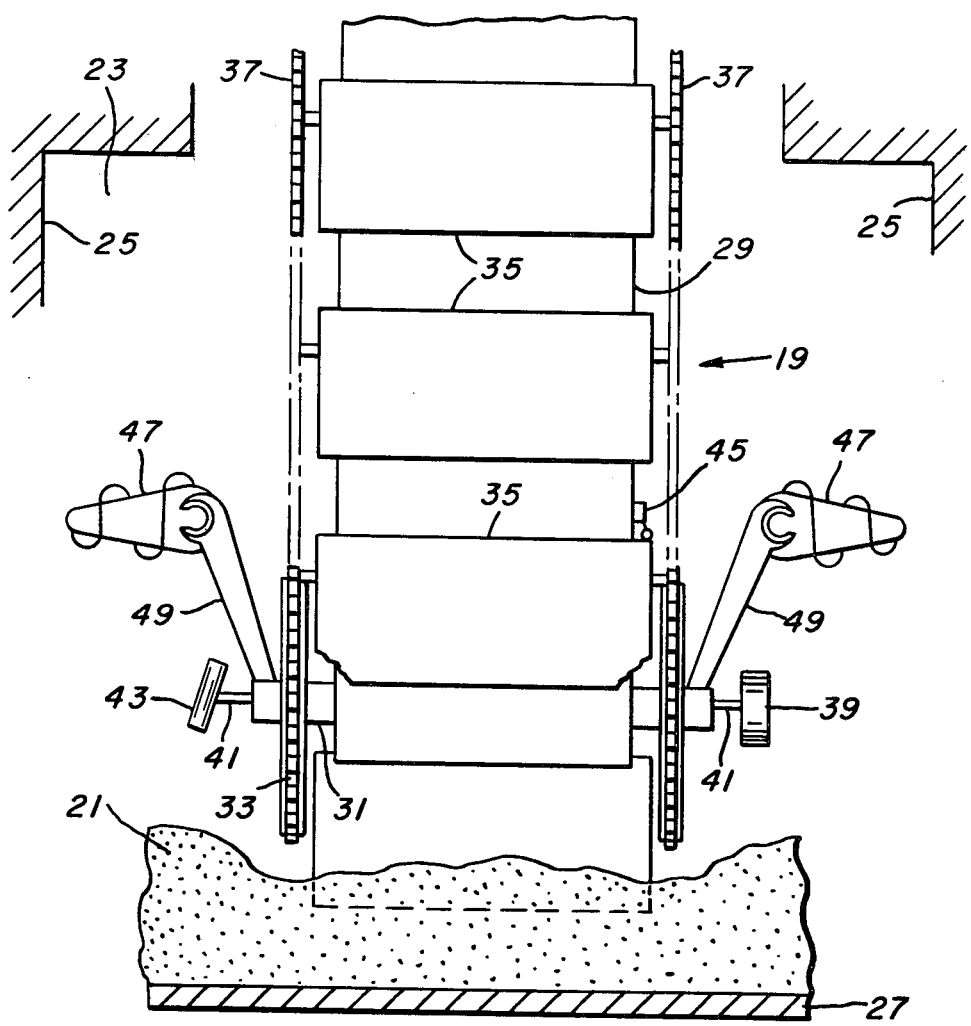
FIG. 4 is a front elevation view of a bucket ladder equipped with the invention.
Figure 5:
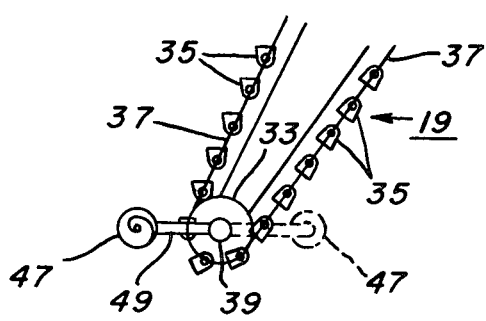
FIG. 5 is a simplified side elevation view of the bucket ladder of FIG. 4 showing alternate positions of certain operating equipment attached to the ladder.

FIGS. 4 and 5 illustrate the application of the invention to a device for determining the distance from the bottom of a bucket ladder 19 unloading bulk cargo 21 from the hold 23 of a ship 25 to the steel plate or hull 27 forming the floor of the cargo hold. The bucket ladder 19, which is of the type disclosed in U.S. Pat. Nos. 3,756,375 and 3,847,270, includes a frame 29 supporting a shaft 31 at the lower end thereof upon which are mounted a pair of sprocket wheels 33. A plurality of buckets 35 are pivotally connected between a pair of chains 37 which are guided by the sprocket wheels 33. As the chains are driven in a continuous path by upper sprocket wheels (not shown), the buckets scoop up the bulk material 21 and carry it upward.

The transmitter and receiver antennae of the device for measuring the distance from the bottom of the bucket ladder to the floor 27 of the cargo hold are mountd on the lower end of the bucket ladder 19 with the prescribed separation $d$. Suitably, the wire loop transmitter antenna may be mounted in a disc-shaped housing 39 secured to one end of the stationary shaft 31 by a bracket 41 while the stick type receiver antenna is mounted in a cylindrical housing 43 secured by a bracket 41 to the other end of the shaft 31. The housings which are constructed of materials having negligible magnetic permeability such as fiber glass protect the antennae from the bulk material and salt water that may be present in the bottom of the hold.

The housing 43 containing the stick type receiver antenna is cocked somewhat from the perpendicular to geometrically substantially null out the magnet effects of the fixed portions of the bucket ladder 19 in the manner discussed above. Normally, the rotating buckets 35 and chains 37, which are constructed of steel and constitute cyclically movable magnetically permeable elements, would cause large perturbations in the signal detected by the receiver antenna. In order to eliminate these effects, a detector 45, which may be mechanical but is preferably of the noncontact type such as a photoelectric, acoustical or magnetic detector, generates triggering signals when the rotating buckets are at preselected positions relative to the antenna. These triggering signals are utilized to synchronize the operation of the receiver circuit connected to the receiver antenna in a manner to be discussed below.

The bucket ladder illustrated in FIGS. 4 and 5 is equipped with a pair of dislodging screws 47 mounted on rotatable arms 49. As shown in FIG. 5, these arms are rotatable from the vertical stowed position shown in FIG. 4 to positions in front of (as shown in solid lines in FIG. 5) or behind (as shown in dashed lines) the bucket ladder and to various other positions to draw the bulk material 21 toward the buckets 35 on the bucket ladder 19. These dislodging screws also cause perturbations in the magnet field, however, their affect on the detected field signal may be nulled out electrically for each operating position in a manner discussed below.

Figure 6:
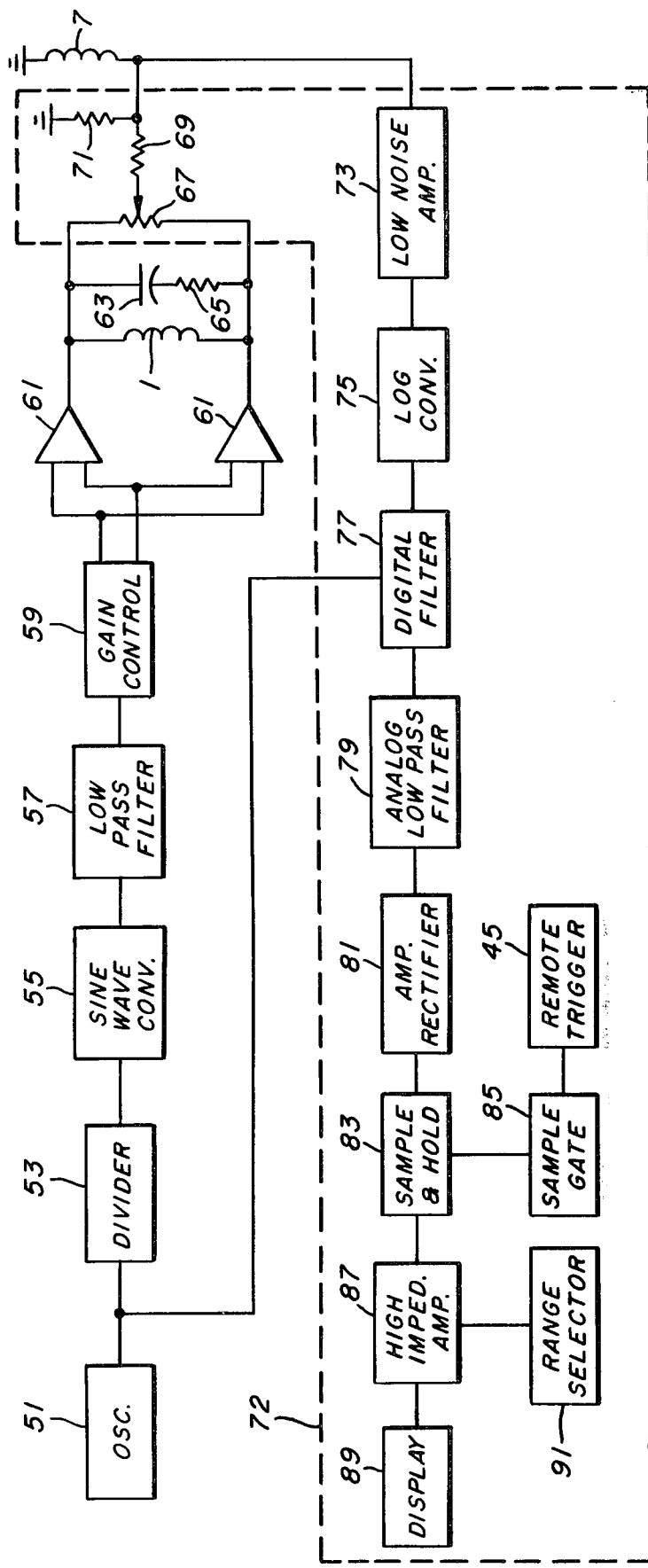
FIG. 6 is a block diagram of a transmitter and receiver circuit according to the invention.

A suitable electronic circuit for the distance measuring device is schematically illustrated primarily in block diagram form in FIG. 6. It was determined semi-empirically that 10 kHz was a suitable frequency for application of the invention to a ship unloader. Since digital filtering, which is a well-known electronic technique, was employed, the oscillator 51 generates an 80 kHz pulse signal which is reduced to 10 kHz by divider 53 and shaped into a sine wave by sine wave converter 55. The signal is then passed through a low pass filter 57 to eliminate harmonics and then applied through gain control 59 and drives 61 to the transmitting antenna 1. A suppressor comprising a series connected capacitor 63 and resistor 65 is connected across the transmitter antenna 1 to suppress a small signal high frequency oscillation characteristic of the driver amplifiers 61.

For balanced conditions, the net flux of the magnetic field generated by the transmitter antenna 1 passing through the receiver antenna 7 is zero. However, perturbations to the magnetic field such as that caused by the steel plate forming the bottom of a cargo hold cause a small current to be induced in the receiver antenna 7. Perturbations caused by intervening magnetically permeable bulk material, the dislodging screws in their various operating positions and other magnetically permeable objects not nulled out by the mechanical positioning of the antennae also induce small currents in the receiver antenna circuit. These undesired signals can be nulled out electrically by feeding a small signal from the transmitter into the receiver circuit through potentiometer 67 and resistors 69 and 71.

The net received signal is amplified in the low noise amplifier 73 of the receiver circuit 72 and then fed to a log converter 75. The purpose of the log converter is to transform the received signal, which is approximately proportional to $1/D^3$, to a signal which is approximately linearly, inversely proportional to the distance D between the antenna and the floor of the hold. The log converted signal is then filtered to reject spurious signals by a digital filter 77 controlled by an 80 kHz signal from the oscillator 51. Multiplexing noise which is typically injected by a commutating digital filter is removed by a low pass analog filter 79. The resulting signal, the amplitude of which is representative of the nearness of the antennae pair to the floor of the cargo hold, is rectified in the amplifier-rectifier 81.

As discussed above, the operation of the receiver circuit can be synchronized with the rotation of the buckets on the bucket ladder in order to eliminate their affect on the output signal when attachment positions of the antennae cause these signals to be present. This is accomplished by a sample and hold circuit 83 controlled by a sample gate 85 which in turn is triggered by the remote trigger in the form of the detector 45. The output of the amplifier-rectifier 81 is sampled at intervals when the buckets are in their predetermined position and stored until the next triggering signal. The stored signal is applied to an output device 89 such as a meter through a high impedance amplifier 87. A range selector 91 permits larger scale display of the distance measurement as the buckets approach the floor of the cargo hold. It was found that some positions of the antennae are shielded by the boom from bucket motion. In this case, the sample and hold circuit can be bypassed.

Figure 7:
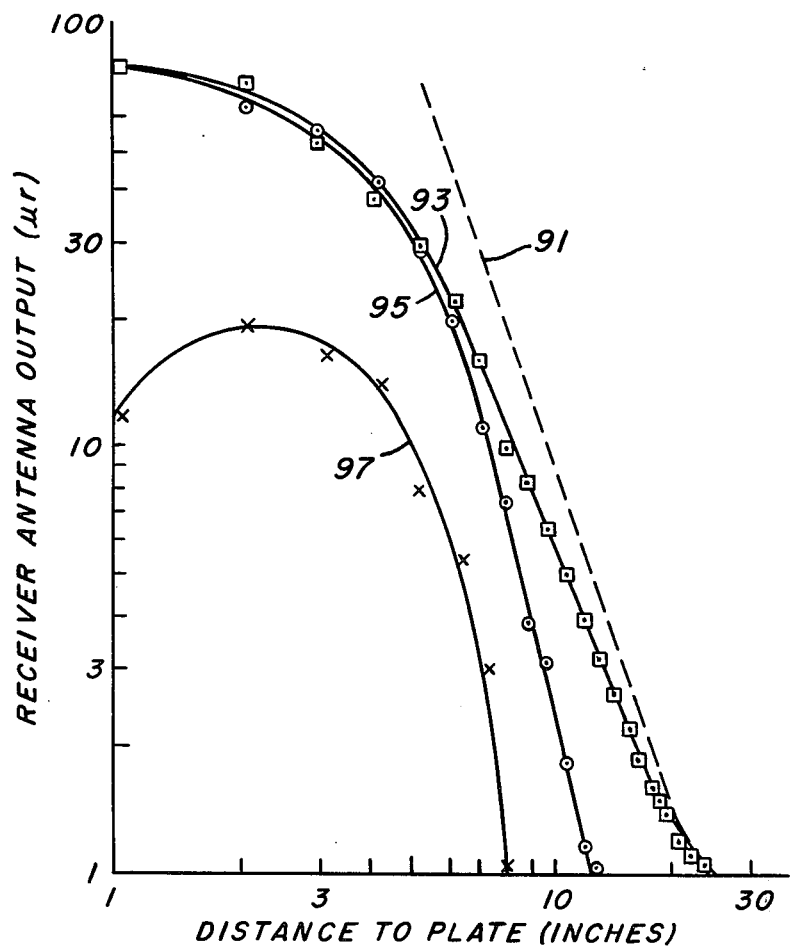
FIG. 7 is a graph illustrating the response of the receiver circuit of FIG. 6 in measuring the distance to a large metallic plate with and without intervening magnetically permeable sinter and in measuring the depth of a layer of magnetically permeable sinter without the metal plate.

FIG. 7 is a graphical representation of the results of a test conducted on a representation of a 1/10 scale model of the ship unloader disclosed in U.S. Pat. Nos. 3,756,375 and 3,847,270. The floor of the test cargo hold was a 36 × 36 × 1/16 inch plate of galvanized steel. The ordinate represents the level of the signal induced in the receiver antenna in microvolts while the abscissa represents the distance in inches from the model antennae to the steel plate. The dashed line 91 represents the theoretical $1/D^3$ relationship of signal strength to distance. The curve 93 connecting the data points identified by the squares illustrates the relationship of receiver-antenna signal strength to the distance between the antenna and the steel plate in the test model with intervening air media. The curve 95 connecting the data points, identified by the circles, illustrates the same relationship for intervening iron oxide sinter having a relative permeability of 80 compared to a permeability of 120 for the steel plate. The receiver was nulled electrically in the manner discussed above at the surface of the sinter prior to commencement of simulated digging. For these tests, the transmitter antenna was a 3 inch diameter wire loop antenna and the receiver antenna was a 3 inch 100P antenna displaced 10 inch from the transmitter. The curves 93 and 95 show that for measurements in the order of the dimensions of the antennae, the $1/D^3$ law is a close approximation to the relationship between measured signal strength and distance to the steel plate. These curves also show that as the distance to the steel plate approaches the dimensions of the antennae, the relationship of signal strength to distance does not follow the $1/D^3$ law as expected. These curves further show that these relationships remain valid whether the intervening material is air or magnetically permeable bulk material as long as the effects of the magnetically permeable bulk material are nulled out at the surface thereof initially. Preset electrical nulling signals for bulk materials of various permeabilities can be developed and set in by the operator as the situation dictates. In the tests with the representation of the 1/10 scale model, the same transmitter signal lever was used for air and sinter as the intervening material. The greater absorption of the magnetic field by the magnetically permeable sinter is reflected in the difference in the maximum detection distance for a given sensitivity limit of the detection device. With air as the intervening material, the maximum detection distance D was $2d$ while for the sinter it was $1.2d$. Of course, the maximum detection distance for magnetically permeable intervening materials can be increased by increasing the gain of the transmitter. Tests of varying antennae size, distance $d$, and generated power indicate that proportionally greater maximum detection distances can be achieved on a full scale unloader.

The curve 97 in FIG. 7 illustrates the application of the invention to detecting the depth of magnetically permeable material having a planar surface such as magnetically permeable ore or sinter resting on the ground with no steel plate present. This curve shows that again the ratio of the receiver antenna signal level to the depth of the material follows the $1/D^3$ law until the depth approaches the dimensions of the apparatus antenna. As the depth is further reduced, the signal level drops off as is to be expected as the magnetically permeable material is removed. As mentioned previously, the invention may be used in this mode for indicating to the operator of bulk material reclaiming apparatus that he is approaching the bottom of the pile and could also be incorporated into automatic control of such equipment.

Distance measuring equipment constructed in accordance with this invention is particularly useful when applied to bulk material handling equipment since it is unaffected by the moisture content of the material and even the presence of salt water often found in the hold of a cargo ship. The prior art eddy current distance measuring devices, on the other hand, which rely upon the electrical conductivity of the subject and intervening materials are unreliable when the moisture content and conductivity is uncertain. The invention is also adaptable to other applications where it is desired to measure distances to or through magnetically permeable materials. Examples of such applications include the detection of the presence of railroad cars and through the measurement of the distance thereto, the determination of which of a number of tracks the car is on. Another application would be the measurement of the distance of an aircraft to the approach end of a runway or its height above a particular point on the approach. It is clear then that the invention has many applications and its scope is to be limited only by the following claims.

I claim:

1. Apparatus for measuring the distance to the floor of a large magnetically permeable container such as the cargo hold of a ship through intervening bulk material including a dipole field generating magnetic field radiator, a dipole field sensitive receiver antenna, said field radiator and receiver antenna being displaced from one another in a direction parallel to the floor of the cargo hold by a distance $d$ at least equal to the dimensions of the radiator with the axis of the field of one parallel to the floor of the cargo hold and displaced therefrom a distance D which distance is the same order as $d$ and with the axis of the field of the other intersecting and perpendicular to the axis of the field of the first and substantially perpendicular to the floor of the cargo hold, and a receiver circuit connected to the receiver antenna including a log converter for generating from the perturbations in said magnetic field produced by the magnetically permeable floor of the cargo hold and detected by the receiver antenna, a signal proportional to the distance D.

2. The apparatus of claim 1 wherein the distance D is less than approximately $2d$.

3. The apparatus of claim 2 wherein the field radiator includes a transmitting antenna and a transmitter connected thereto comprising a high frequency oscillator and means including a divider for generating a radiated magnetic field having a frequency which is a fraction of that of said oscillator and less than 50 kHz and wherein said receiver circuit includes a digital filter driven by said high frequency oscillator.

4. The apparatus of claim 3 wherein the axis of the magnetic field generated by the transmitter antenna is parallel to the magnetically permeable floor of the cargo hold and the axis of the receiver antenna is substantially perpendicular thereto.

5. The apparatus of claim 3 including nulling means which null out perturbations in the magnetic field other than those caused by the magnetically permeable cargo hold.

6. The apparatus of claim 5 wherein the nulling means includes means for adjusting the orientation of the receiver antenna relative to the transmitter antenna.

7. The apparatus of claim 5 wherein the nulling means includes electrical means in the receiver circuit which substantially cancels out any signal induced in the receiver antenna other than that produced by the magnetically permeable cargo hold.

8. The apparatus of claim 5 in combination with a magnetically permeable support to which said transmitter and receiver antennae are connected and wherein said nulling means includes means to null out perturbations in the magnetic field caused by said magnetically permeable support.

9. The apparatus of claim 5 wherein said intervening bulk material is magnetically permeable and wherein the nulling means includes means to null out perturbations in the magnetic field caused by said intervening bulk material.

10. The apparatus of claim 5 wherein said antennae are mounted on a support carrying cyclically movable, magnetically permeable elements and wherein said receiver circuit includes a sample and hold circuit which samples and stores a signal proportional to the signal induced in the receiver antenna in response to triggering signals, triggering means for generating triggering signals when the cyclically movable, magnetically permeable elements are in a predetermined position, and utilization means for utilizing the signal stored in the sample and hold circuit, said nulling means being adjustable to null out perturbations in the magnetic field caused by the cyclically movable, magnetically permeable elements when they are in said predetermined positions.

11. The apparatus of claim 10 wherein said support is also magnetically permeable and said nulling means is adjustable to null out perturbations to the magnetic field caused by both the magnetically permeable support and the magnetically permeable elements in their predetermined positions.

12. The apparatus of claim 11 wherein said support is a bucket ladder extending down into the cargo hold with the transmitter and receiver antennae attached thereto, the cyclically movable, magnetically permeable elements are buckets which circulate in a continuous loop on the bucket ladder to unload the bulk material from the cargo hold and the triggering means generates triggering signals which trigger the sample and hold circuit to sample and store a signal proportional to that induced in the receiver antenna at intervals when the buckets adjacent the transmitter and receiver antennae are in predetermined positions relative thereto.

13. The apparatus of claim 12 wherein the bulk material in the cargo hold is magnetically permeable but with a permeability which differs from that of the floor of the cargo hold and wherein the nulling means includes means for nulling out perturbations in the magnetic field caused by the magnetically permeable bulk material.

* * * * *